United States Patent
Kuang

(10) Patent No.: US 7,970,075 B2
(45) Date of Patent: Jun. 28, 2011

(54) APPARATUS AND METHOD FOR UP-CONVERSION OF RADIO SIGNALS

(75) Inventor: Wensheng Vincent Kuang, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1322 days.

(21) Appl. No.: 11/531,934

(22) Filed: Sep. 14, 2006

(65) Prior Publication Data

US 2008/0069266 A1    Mar. 20, 2008

(51) Int. Cl.
    *H04L 27/04*      (2006.01)
(52) U.S. Cl. ........................................ 375/295
(58) Field of Classification Search .................. 375/238, 375/239, 295, 268; 370/212, 213; 332/109, 332/112
See application file for complete search history.

(56) References Cited

U.S. PATENT DOCUMENTS

| | | | |
|---|---|---|---|
| 5,446,917 A * | 8/1995 | Krisciunas et al. ............. | 710/69 |
| 6,628,166 B2 | 9/2003 | Delano | |
| 7,058,464 B2 * | 6/2006 | Mallinson ....................... | 700/94 |
| 2004/0017306 A1 * | 1/2004 | Miao .............................. | 341/155 |
| 2004/0252038 A1 * | 12/2004 | Robinson et al. ............. | 341/143 |

OTHER PUBLICATIONS

Dapkus, "Class-D Audio Power Amplifiers: An Overview", "Digest of Technical Papers. Int. Conference on 2000", pp. 400-401, Publisher: Consumer Electronics 2000 ICCE.
Iwamoto et al., "Bandpass delta-sigma class-S amplifier", Jun. 18, 2000, pp. 1010-1012, vol. 36, No. 12, Publisher: IEEE Electronics Letters.
Jayaraman et al., "Linear High-Efficiency Microwave Power Amplifiers Using Bandpass Delta-Sigma Modulators", "IEEE Microwave and Guided Wave Letters", Mar. 1998, pp. 121-123, vol. 8, No. 3.
Win et al., "Impulse Radio: How it works", "IEEE Communication Letters", Jan. 1, 1998, pp. 10-12, vol. 2, No. 1.

* cited by examiner

*Primary Examiner* — Kevin Y Kim

(57) ABSTRACT

Apparatus and method for up-conversion of radio signals are disclosed. For example, an apparatus for up-conversion of radio signals is disclosed. The apparatus includes a signal conversion unit operable to convert an input signal to a plurality of single bits of data, a narrow pulse generator unit coupled to the signal conversion unit, the narrow pulse generator unit operable to generate a narrowly defined pulse for a single bit of data of the plurality of single bits of data, and a digital-to-analog conversion unit coupled to the narrow pulse generator unit, the digital-to-analog conversion unit operable to up-convert a frequency of the single bit of data.

20 Claims, 2 Drawing Sheets

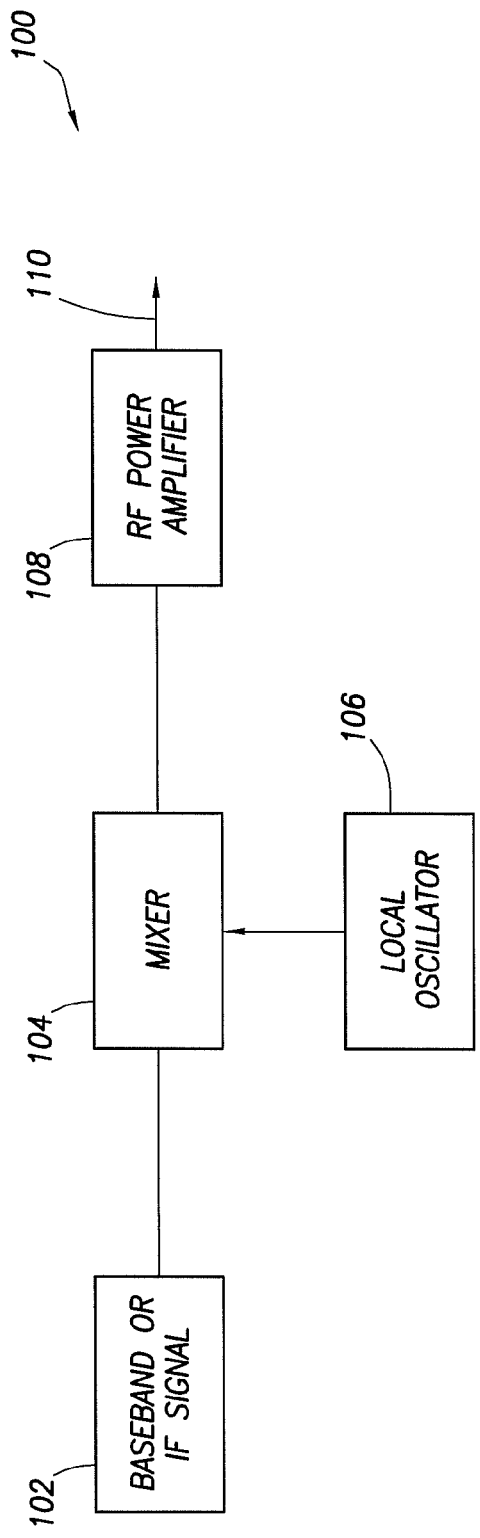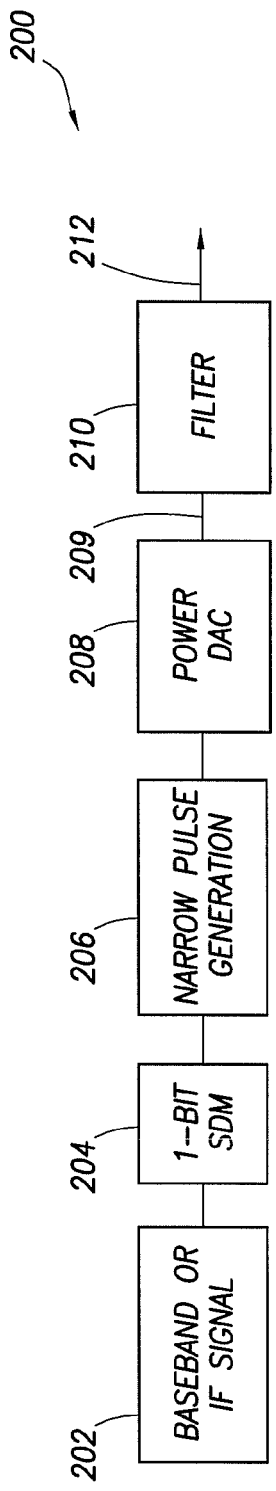

APPARATUS AND METHOD FOR UP-CONVERSION OF RADIO SIGNALS

FIELD OF THE INVENTION

The invention relates to the communications field, and more particularly, but not exclusively, to an apparatus and method for up-conversion of radio signals.

BACKGROUND OF THE INVENTION

FIG. 1 is a simplified block diagram 100 that illustrates a conventional technique used for transmitting a radio signal. The signal 102 at baseband (BB) or intermediate frequency (IF) is up-converted to radio frequency (RF), by mixing through the mixer 104 with a signal from the local oscillator (LO) 106. The resulting RF signal is then power amplified by the RF power amplifier 108 for transmission 110. Efficient power amplification is preferred especially for portable radio devices. Analog power amplification is inefficient in power consumption or troubled by nonlinear distortion problems. There has been a lot of effort expended to develop an efficient digital RF power amplifier that can overcome these problems. However, implementing such a digital amplifier at RF is technically very challenging because of the high sampling rates involved. Therefore, an overriding goal of radio transmitter designers is to improve the up-conversion and power amplification of radio signals.

SUMMARY OF THE INVENTION

Apparatus and method for up-conversion of radio signals are provided. In one example embodiment, an apparatus for up-conversion of radio signals includes a signal conversion unit operable to convert an input signal to a plurality of single bits of data, a narrow pulse generator unit coupled to the signal conversion unit, the narrow pulse generator unit operable to generate a narrowly defined pulse for a single bit of data of the plurality of single bits of data, and a digital-to-analog conversion unit coupled to the narrow pulse generator unit, the narrow pulse generator unit and the digital-to-analog conversion unit operable to up-convert a frequency of the single bit of data.

In a second example embodiment, a digital power amplifier and up-converter for a radio transmitter are provided, which includes a single-bit Sigma-Delta modulator stage, a narrow pulse generation stage coupled to an output of the single-bit Sigma-Delta modulator stage, and a power digital-to-analog converter stage coupled to an output of the narrow pulse generation stage.

In a third example embodiment, a method for up-conversion of a radio signal is provided, which includes the steps of converting an input signal to a plurality of single bits of data, generating a narrowly defined pulse for a single bit of data of the plurality of single bits of data, and digital power amplifying the narrowly defined pulse.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts is a simplified block diagram that illustrates a conventional technique used for transmitting a radio signal;

FIG. 2 depicts a simplified block diagram of an apparatus for up-conversion of radio signals, which can be used to implement an example embodiment of the present invention.

DETAILED DESCRIPTION OF PREFERRED EMBODIMENT

Figure 3:
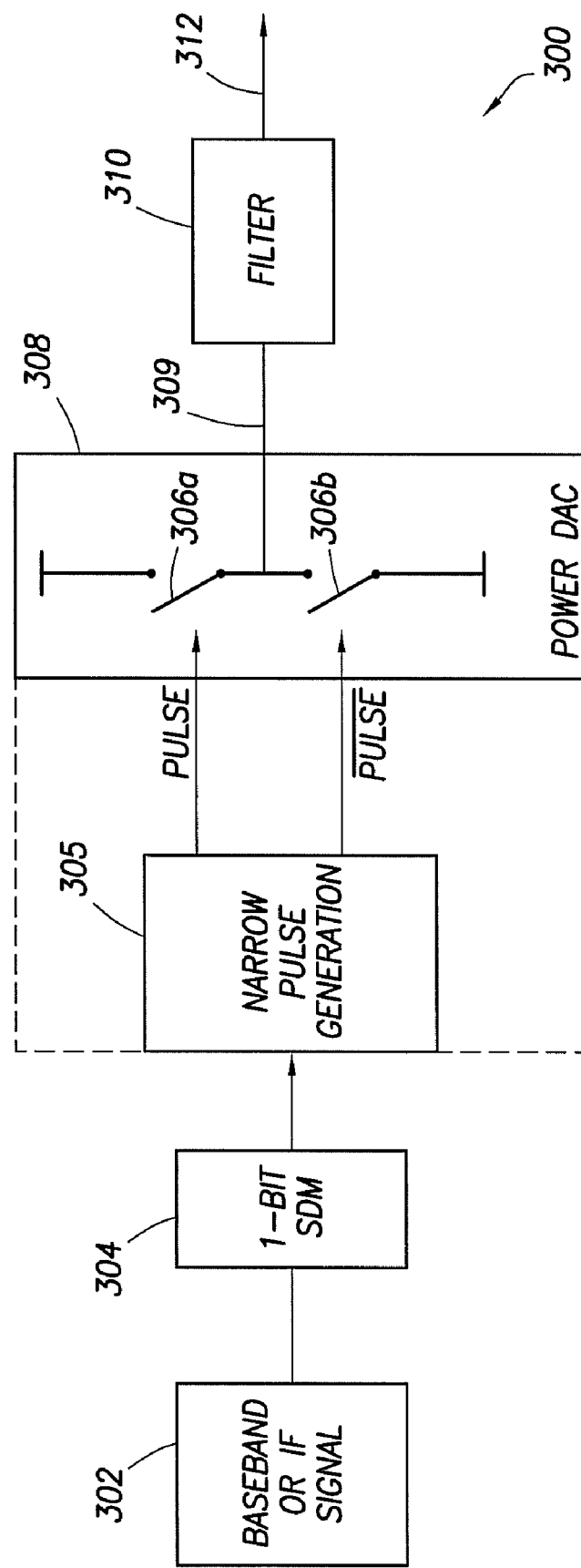
FIG. 3 is a simplified block diagram that depicts an example up-conversion configuration, which may be used to implement the apparatus shown in FIG. 2.

Essentially, an apparatus and method are provided for up-converting a radio signal, without having to use a mixer or LO stage, and with a power digital-to-analog converter (DAC) operating at a much slower sampling rate than RF. In one example embodiment, the up-conversion function is incorporated into a digital power amplifier. The digital power amplifier function is provided by including a narrow pulse generation stage between a Sigma-Delta modulator stage and a power DAC stage. The input signal can be maintained at BB or IF, and the resulting output signal will be at RF. This novel approach is fundamentally different from any existing approach that uses a digital RF power amplification stage whose input and output signals are at the same frequency. Also, this novel approach addresses up-conversion and the entire transmission process, and not just the power amplification portion of the process.

For example, the input radio signal may be provided digitally at BB or IF and can be plotted in the first Nyquist sampling zone (0---Fs/2). However, the spectrum of the input radio signal extends well into the higher frequencies and/or upper sampling zones (NFs---NFs+Fs/2) and theoretically to infinity. In practice, the aperture effect of the digital pulse output from the narrow pulse generation stage attenuates the spectral copies of the input signal at the higher frequencies. However, for illustrative purposes and ease of understanding, it may be assumed that the generated digital pulse is narrow enough, so that suitable spectral copies of the radio signal can be retained at RF and selected for transmission at the output of the radio transmitter involved.

With reference now to the figures, FIG. 2 depicts a simplified block diagram of an apparatus 200 for up-conversion of radio signals, which can be used to implement an example embodiment of the present invention. For this example embodiment, apparatus 200 includes a radio signal input stage 202 connected to a Sigma-Delta modulator stage 204. Input stage 202 couples an input signal at BB or IF to Sigma-Delta modulator stage 204. In this example embodiment, Sigma-Delta modulator stage 204 is a 1-bit Sigma-Delta modulator, which converts the input signal (at BB or IF) to a digital 1-bit (two level) output signal (digital data stream). Essentially, the Sigma-Delta modulator stage 204 converts the input signal into a 1-bit code that is suitable for controlling power switches.

Each bit at the output of the Sigma-Delta modulator stage 204 is coupled to a narrow pulse generator stage 206. The narrow pulse generator stage 206 generates a narrow pulse at its output for each input bit received. Note that the frequency of the data stream from Sigma-Delta modulator stage 204 is still BB or IF, and the narrow pulse generator stage 206 generates and outputs a very narrow pulse (e.g., sub-nanosecond pulse, impulse, etc.) for each input bit received. The narrow pulse generator stage 206 does not have to be a physically independent unit; instead it can be incorporated, as a function or design feature, into the single-bit Sigma-Delta modulator stage 204 or the power DAC stage 208 shown.

The stream of narrow pulses at the output of the narrow pulse generator stage 206 is coupled to a power DAC stage 208. By driving the power DAC stage 208 with a stream of narrow pulses, the output connection 209 provides multiple suitable copies of the input signal at the higher end of the frequency spectrum involved. The output signals from the power DAC stage 208 are coupled to an RF bandpass filter stage 210, which passes an RF signal as its output 212.

FIG. 3 is a simplified block diagram that depicts an example up-conversion configuration 300, which may be used to implement apparatus 200 shown in FIG. 2. Referring to the example embodiment shown in FIG. 3, configuration 300 includes a single-bit Sigma-Delta modulator 304, which converts the input signal 302 (at BB or IF) to a digital 1-bit (two level) output signal (digital data stream). The two-level single-bit data stream is coupled to a narrow pulse generator 305, which generates a stream of narrow pulses which are coupled to the respective switching elements 306a, 306b of a power DAC 308. For example, power DAC 308 may be implemented with suitable semiconductor switches or a similarly functioning device. By driving the power DAC 308 with a stream of narrow pulses, the power DAC 308 up-converts and amplifies the input (BB or IF) signal to a plurality of spectral copies at the higher frequencies of the spectrum involved. The spectral copies of the input signal at the higher frequencies at output connection 309 are coupled to an RF bandpass filter 310, which passes a suitable RF signal as its output 312 at a predetermined RF level. Notably, as indicated by the dashed lines, narrow pulse generator 305 may be incorporated into the power DAC 308 as an integral component of the power DAC 308, or the narrow pulse generator 305 may be implemented as a separate component.

Advantageously, the present invention provides an up-conversion and amplification apparatus and method whereby the input circuitry may be operated and clocked at a relatively low frequency, and the up-conversion, digital-to-analog conversion, and power amplification may be performed at the same time (e.g., within the same stage). Also, the present invention provides an up-conversion apparatus and method, which does not require the use of a conventional mixer (LO), phase-locked loop, synthesizer or analog power amplifier. Furthermore, the present invention provides an up-conversion and amplification apparatus and method that can be implemented with a highly efficient, highly linear digital power amplifier stage.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. An apparatus for up-conversion of a radio signal, comprising:
   a signal conversion unit operable to convert an input signal to a plurality of single bits of data;
   a narrow pulse generator unit coupled to the signal conversion unit, the narrow pulse generator unit operable to generate a narrowly defined pulse for a single bit of data of the plurality of single bits of data; and
   a digital-to-analog conversion unit coupled to the narrow pulse generator unit, the digital-to-analog conversion unit operable to up-convert a frequency of the single bit of data and amplify a signal associated with the single bit of data.

2. The apparatus of claim 1, wherein the signal conversion unit comprises a Sigma-Delta modulator.

3. The apparatus of claim 1, wherein the digital-to-analog conversion unit comprises a power DAC.

4. The apparatus of claim 1, wherein the narrow pulse generator unit and the digital-to-analog conversion unit comprise a digital power amplifier.

5. The apparatus of claim 1, further comprising:
   a filter unit coupled to the digital-to-analog conversion unit, the filter unit operable to output a RF signal at a predetermined level.

6. The apparatus of claim 1, further comprising:
   a signal input unit coupled to the signal conversion unit, the signal input unit operable to input a signal at a baseband frequency or an intermediate frequency.

7. The apparatus of claim 1, wherein the narrow pulse generator unit and the digital-to-analog conversion unit comprise a single apparatus.

8. The apparatus of claim 1, wherein the narrow pulse generator unit and the signal conversion unit comprise a single apparatus.

9. A digital power amplifier and up-converter for a radio transmitter, comprising:
   a single-bit Sigma-Delta modulator stage;
   a narrow pulse generation stage coupled to an output of the single-bit Sigma-Delta modulator stage; and
   a power digital-to-analog converter stage coupled to an output of the narrow pulse generation stage, and configured to amplify a power level of the input signal.

10. The digital power amplifier and up-converter of claim 9, further comprising:
    an input stage coupled to an input of the single-bit Sigma-Delta modulator stage, the input stage operable to input a signal at a baseband frequency or at IF.

11. The digital power amplifier and up-converter of claim 9, further comprising:
    a RF bandpass filter coupled to an output of the power digital-to-analog converter stage, the RF bandpass filter operable to output an RF signal associated with a signal input to the single-bit Sigma-Delta modulator stage.

12. The digital power amplifier and up-converter of claim 9, wherein the narrow pulse generator stage and the power digital-to-analog converter stage convert a baseband or IF signal to an RF signal.

13. A method for up-conversion of a radio signal, comprising:
    converting an input signal to a plurality of single bits of data;
    generating a narrowly defined pulse for a single bit of data of the plurality of single bits of data;
    digital power amplifying the narrowly defined pulse; and
    performing a digital-to-analog conversion of the narrowly defined pulse.

14. The method of claim 13, further comprising:
    RF bandpass filtering an output from the performing step.

15. The method of claim 13, wherein the converting is performed with a Sigma-Delta modulator.

16. The method of claim 13, wherein the generating is performed with a narrow pulse generator stage.

17. The method of claim 13, wherein the digital power amplifying is performed with a power digital-to-analog converter.

18. The method of claim 13, wherein the generating and the digital power amplifying step are performed with a digital power amplifier.

19. The method of claim 13, wherein the plurality of single bits of data comprises a two level output code configured to control a power switch.

20. The method of claim 13, wherein generating comprises generating a sub-nanonsecond pulse of each of the plurality of single bits of data.

* * * * *